US008549019B2

(12) United States Patent
Nandy et al.

(10) Patent No.: US 8,549,019 B2
(45) Date of Patent: Oct. 1, 2013

(54) DYNAMICALLY GENERATING AGGREGATE TABLES

(75) Inventors: Sagnik Nandy, Los Gatos, CA (US); Kevin Damm, San Francisco, CA (US); David White, Keller, TX (US)

(73) Assignee: Google Inc., Mountain View, CA (US)

( * ) Notice: Subject to any disclaimer, the term of this patent is extended or adjusted under 35 U.S.C. 154(b) by 482 days.

(21) Appl. No.: 12/787,291

(22) Filed: May 25, 2010

(65) Prior Publication Data

US 2010/0318527 A1 Dec. 16, 2010

Related U.S. Application Data

(60) Provisional application No. 61/181,276, filed on May 26, 2009.

(51) Int. Cl.
*G06F 17/30* (2006.01)

(52) U.S. Cl.
USPC .......................................... 707/754

(58) Field of Classification Search
USPC .......................................... 707/754
See application file for complete search history.

(56) References Cited

U.S. PATENT DOCUMENTS

| 5,870,746 | A  |   | 2/1999  | Knutson et al. ............... 707/101 |
| 6,317,787 | B1 |   | 11/2001 | Boyd et al. |
| 6,392,668 | B1 |   | 5/2002  | Murray |
| 6,581,054 | B1 |   | 6/2003  | Bogrett |
| 6,604,095 | B1 |   | 8/2003  | Cesare et al. |
| 6,850,933 | B2 | * | 2/2005  | Larson et al. ........................ 1/1 |
| 6,925,442 | B1 | * | 8/2005  | Shapira et al. ............... 705/7.33 |
| 6,975,963 | B2 |   | 12/2005 | Hamilton et al. |
| 7,085,682 | B1 |   | 8/2006  | Heller et al. |
| 7,310,590 | B1 |   | 12/2007 | Bansal |
| 7,464,122 | B1 |   | 12/2008 | Basko et al. |
| 7,523,191 | B1 |   | 4/2009  | Thomas et al. |
| 7,627,572 | B2 |   | 12/2009 | Bohannon |
| 7,669,212 | B2 |   | 2/2010  | Alao et al. |
| 7,673,340 | B1 |   | 3/2010  | Cohen et al. |
| 7,716,011 | B2 |   | 5/2010  | Thibaux et al. |
| 7,895,012 | B2 |   | 2/2011  | Turicchi, Jr. |
| 2003/0158795 | A1 |   | 8/2003 | Markham et al. |

(Continued)

FOREIGN PATENT DOCUMENTS

| KR | 10-0695467 B1 | 3/2007 |
| WO | WO 02/27528 A1 | 4/2002 |
| WO | WO 2006/133218 A2 | 12/2006 |
| WO | WO 2006/133219 A2 | 12/2006 |

OTHER PUBLICATIONS

International Search Report and Written Opinion for International Application No. PCT/US2010/047341, mailed Dec. 16, 2010, 9 pages.

(Continued)

*Primary Examiner* — Amresh Singh
(74) *Attorney, Agent, or Firm* — Foley & Lardner LLP; John D. Lanza

(57) ABSTRACT

A method and system dynamically create aggregate tables. An aggregate table manager is instantiated that receives a plurality of aggregate table definitions, and generates aggregate tables based on the received aggregate table definitions. The aggregate table manager creates a view corresponding to each of the aggregate tables. The aggregate table manager creates and updates data entries in the aggregate tables based on their corresponding aggregate table definitions and data extracted from web site log files.

20 Claims, 12 Drawing Sheets

(56) References Cited

U.S. PATENT DOCUMENTS

| | | |
|---|---|---|
| 2004/0054784 A1 | 3/2004 | Busch et al. |
| 2005/0114206 A1 | 5/2005 | Bennett et al. |
| 2006/0074905 A1 | 4/2006 | Yun et al. ............ 707/5 |
| 2006/0074910 A1 | 4/2006 | Yun et al. ............ 707/7 |
| 2006/0085741 A1 | 4/2006 | Weiner et al. |
| 2006/0184508 A1 | 8/2006 | Fuselier et al. |
| 2006/0189330 A1 | 8/2006 | Nelson et al. |
| 2006/0277197 A1 | 12/2006 | Bailey |
| 2006/0277585 A1 | 12/2006 | Error et al. |
| 2007/0112607 A1 | 5/2007 | Tien et al. |
| 2007/0185826 A1 | 8/2007 | Brice et al. |
| 2008/0140524 A1 | 6/2008 | Anand et al. |
| 2008/0184116 A1 | 7/2008 | Error |
| 2008/0208910 A1 | 8/2008 | MacIntyre et al. |
| 2008/0275980 A1 | 11/2008 | Hansen ............ 709/224 |
| 2009/0063549 A1 | 3/2009 | Bhatia et al. |
| 2009/0198724 A1 | 8/2009 | Valimaki et al. |
| 2010/0030544 A1 | 2/2010 | Gopalan et al. |
| 2010/0205029 A1 | 8/2010 | Asherman et al. |
| 2010/0287146 A1 | 11/2010 | Skelton et al. |
| 2011/0035272 A1 | 2/2011 | Bhatt et al. |

OTHER PUBLICATIONS

International Search Report and Written Opinion for PCT/US2010/053417 dated May 30, 2011, 8 pgs.

\* cited by examiner

DYNAMICALLY GENERATING AGGREGATE TABLES

CROSS REFERENCE TO RELATED APPLICATIONS

This application claims priority under 35 U.S.C. 119(e) to U.S. Provisional Patent Application 61/181,276 filed May 26, 2009, which is hereby incorporated by reference in its entirety.

This application is related to U.S. patent application Ser. No. 12/787,320, filed May 25, 2010, entitled "System and Method For Aggregating Analytics Data" which is hereby incorporated by reference in its entirety.

TECHNICAL FIELD

The disclosed embodiments relate generally to data processing systems and methods, and in particular to a framework for aggregating analytics data.

BACKGROUND

Web analytics is the measurement, collection, analysis and reporting of internet data for purposes of understanding and optimizing web usage. One method of performing web analytics is performing analysis of logfiles (e.g., files with the .log extension) in which a web server records some or all of its transactions. A logfile typically includes information about a request to a web page hosted by a web site, including client IP address, request date/time, page requested, HTTP code, bytes served, user agent, and referrer. These logfiles can be read and processed to produce web traffic reports.

Analytics data is often generated by aggregating metrics (counts or ratios) over one or more dimensions and storing the aggregated values in aggregate tables. Typically, if a user wishes to create a new aggregate table, a large amount of coding is required.

BRIEF DESCRIPTION OF THE DRAWINGS

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1A:
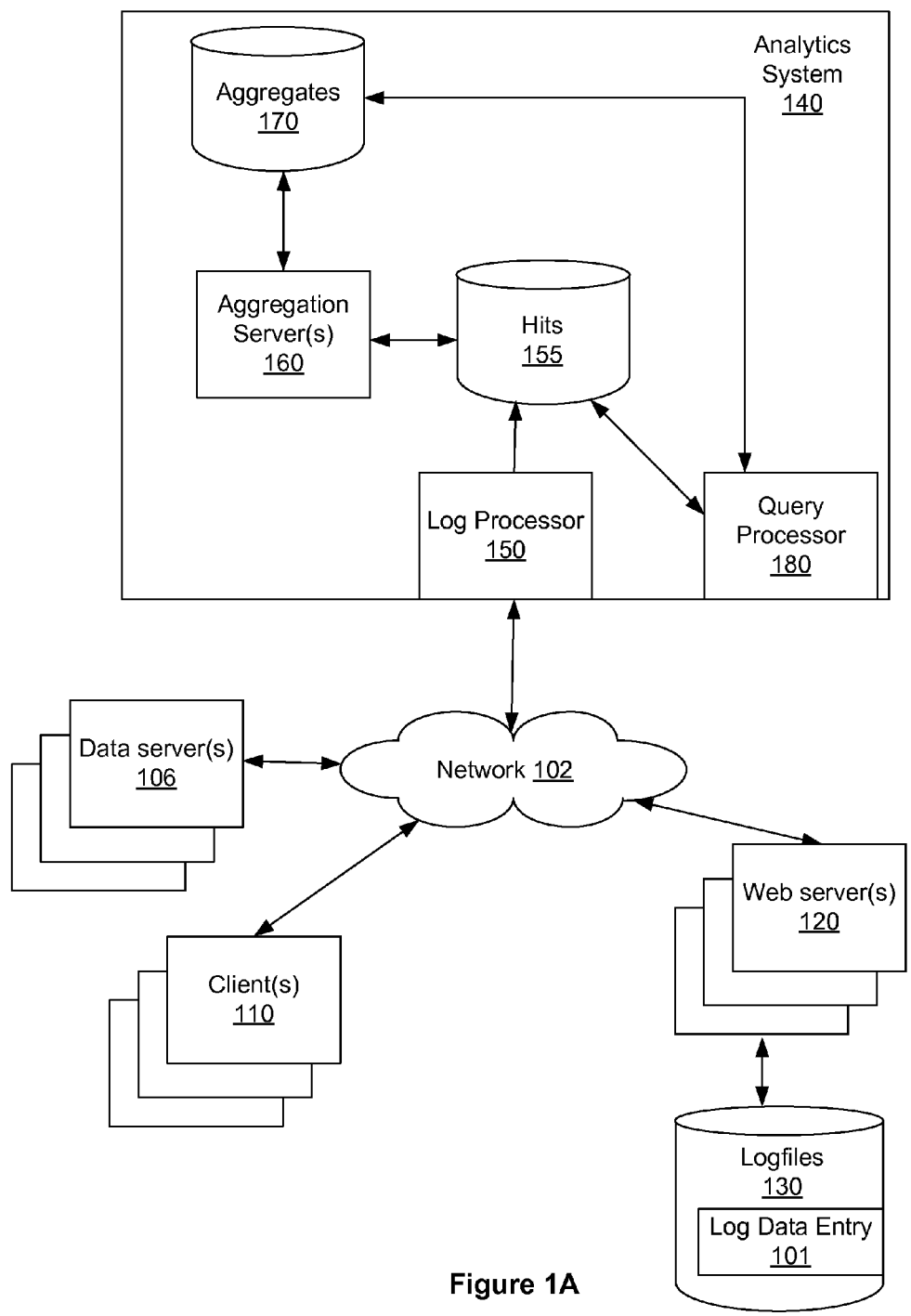
FIG. 1A is a block diagram of a large-scale data processing system in accordance with some embodiments.

FIG. 1A illustrates a distributed computing and data storage system 100 in accordance with some embodiments. The system 100 includes one or more web servers 120 that serve web sites upon receiving requests from clients 110 and that collect web data in logfiles 130. The system 100 includes an analytics system 140 that includes a log processor 150 to extract web page hit data from the logfiles 130 and store the hit data in a hits database 155. Aggregation servers 160 process the hit data to generate aggregated web analytics data that is stored in aggregates database 170. The analytics system 140 includes a query processor 180 to report query results by accessing the aggregates database 170 and returning the web analytics data to analytics users (who use the analytics system to track one or more of their web sites). If the user requests a data element that is not aggregated, the query processor 180 reads the raw hits data in real time and computes the desired aggregates from it.

In some embodiments, the analytics system 140 processes and returns a set of web analytics data that corresponds to a desired data view specified by a user. In some embodiments, the analytics system 140 identifies those hits in the hits database 155 that are context-insensitive and processes those hits to incrementally update a first plurality of aggregate tables in the aggregates database 170. The analytics system 140 identifies the hits in the hits database 155 that are context-sensitive and processes these hits to incrementally update a second plurality of aggregate tables using the second context-sensitive entries, but only at the end of a specified period of time, such as at the end of the day. Doing so speeds up the incremental updates for more than 90% of the data, as discussed below.

The system 100 also includes a plurality of data servers 106 that store one or more data structures, such as tables, that may be used by the analytics system 140 for storage. In some embodiments, the data servers 106 store the logfiles 130, the hit data 155, and/or the aggregate data 170. In some embodiments, data servers 106 are clustered in a data center or in two or more interconnected data centers. In some embodiments, the system 100 includes as many as 1000 data servers or more. The various components of the system 100 are interconnected by a network 102. The network 104 may be any suitable network, including, but not limited to, a local area network (LAN), a wide-area network (WAN), the Internet, an Ethernet network, a virtual private network (VPN), or any combination of such networks.

Log Data

Typically, where an individual visitor directly accesses a web-site served by a web server 120, the log data entry 101 (stored in one or more databases represented by logfiles 130) records multiple variables, among which typically include the IP address, the user agent, the page viewed, the time and date that the page was accessed and a status field. Each line in a log file represents a single "hit" on a file on a web server 120, and consists of a number of fields (explained below). Any server request is considered a hit. For example, when a visitor calls up a web page with six images, that is seven hits—one for the page, and six for the images.

In other circumstances, the visitor may have employed a query in a search engine and the web-site under analysis appears in the results from the search. In such a scenario, a corresponding entry 101 in the log data will reveal a "reference" and the "search term" entered by the visitor. In some circumstances, the visitor is not an individual, but rather a software process such as an Internet robot, spider, link checker, mirror agent, hacker, or other such entity used to systematically peruse vast amounts of data available via the network 102. The log data entry 101 corresponding to such accesses may display an IP address, host name and/or user agent that may be associated with such entities.

Another type of data that may be recorded in a log file 130 is a session identifier or session ID, which is a unique identifier (such as, a number) that a Web site's server assigns a specific user for the duration of that user's visit and that identifies the user's session (a series of related message exchanges). Session identifiers become necessary in cases where the communications infrastructure uses a stateless protocol such as HTTP. For example, a buyer who visits a seller's web site wants to collect a number of articles in a virtual shopping cart and then finalize the shopping transaction by going to the site's checkout page. This typically involves an ongoing communication where several webpages are requested by the client 110 and sent back by the server 120. In such a situation, it is vital to keep track of the current state of the shopper's cart, and a session ID is one way to achieve that goal.

A session ID is typically granted to a visitor on his first visit to a site. It is different from a user ID in that sessions are typically short-lived (they expire after a preset time of inactivity which may be minutes or hours) and may become invalid after a certain goal has been met (for example, once the buyer has finalized his order, he can not use the same session ID to add more items).

Figure 1B:
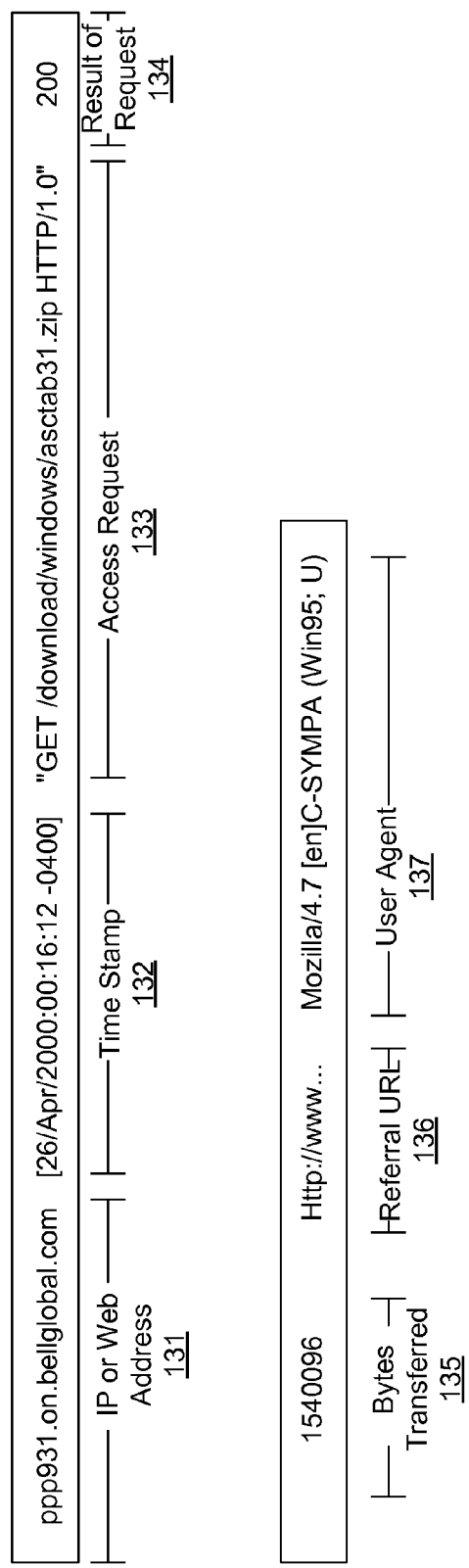
FIG. 1B is an example of a entry from a log file in accordance with some embodiments.

FIG. 1B illustrates an example of an entry 101 from a log file 130, which includes:
- the IP or Web address 131 of the client 110 that contacted a web site served by the web server 120;
- a time stamp 132 of the visit as seen by the web server 120;
- the request made 133 (e.g., a "GET" request for the file "/download/windows/asctab31.zip" using the "HTTP/1.0" protocol);
- a result status code 134 (e.g., 200 signifies success, 405 signifies that the URL does not exist, and so on);
- the number of bytes transferred 135 to client 110;
- the referral URL 136 (the page the visitor was on when they clicked to come to this page);
- and user agent identifier 137 (the software, such as the web browser application, used to access the site).

In the example illustrated in FIG. 1B, the user agent identifier 136 is "Mozilla/4.7 [en]C-SYMPA (Win95; U)", which implies that an English version of Netscape 4.7 was used and "Win 95" indicates Windows 95.

While log data is discussed throughout this document, it is noted that the methods described herein could be applied to other types of data records, such as transaction records or documents. The records can be in ASCII, binary, or any other file type, and can include both real-time data and off-line data.

Analytics System 140

The analytics system 140 includes a log processor 150 that accesses unread data in logfiles 130, processes the data, and stores the processed data in one or more "hits" databases 155. The log processor 150 is further described with reference to FIGS. 2A and 2B. The hits database 155 stores data in one or more data structures, such as tables, an example of which is illustrated in FIG. 5. The analytics system 140 includes aggregator servers 160 that access data stored in the hits database 155, aggregate analytics data and store the aggregated data in one or more aggregate databases 170. The aggregator servers 160 are further described with reference to FIGS. 3A, 3B, and 4. The analytics system 140 may also include a query processor 180 for reporting of aggregate data.

Log Processor 150

Figure 2A:
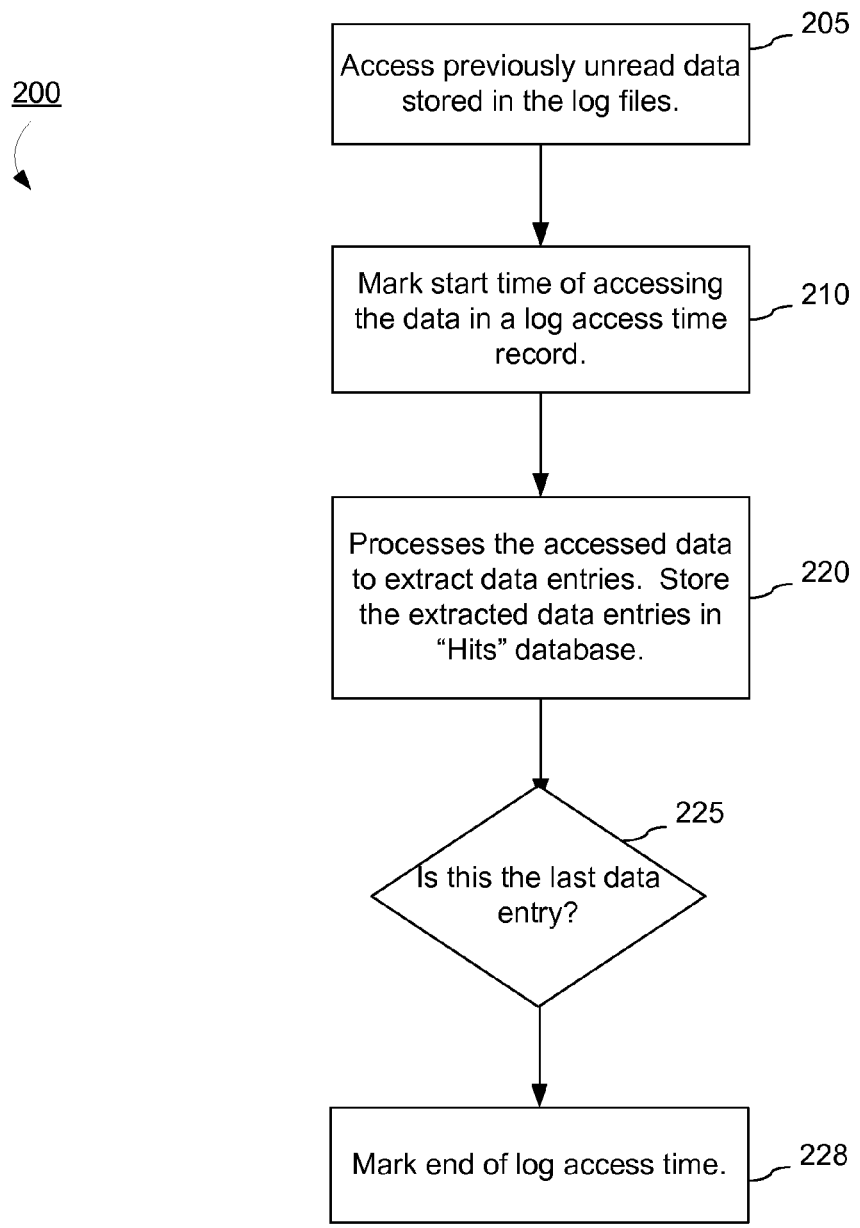
FIG. 2A is a flow diagram of an embodiment of a process for processing log data.
Figure 2B:
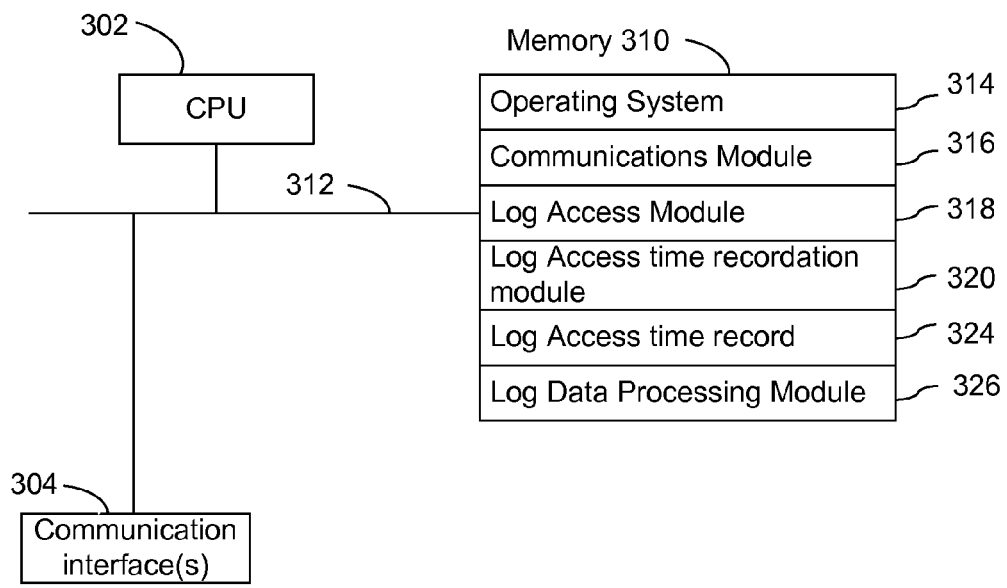
FIG. 2B is a block diagram of an embodiment of a log processor system.

FIG. 2A illustrates a flow diagram of a method 200 performed by the log processor 150, an example embodiment of which is discussed in reference to FIG. 2B.

Referring to FIG. 2B, the log processor 150 generally includes one or more processing units (CPUs) 302, one or more network or other communications interfaces 304, memory 310, and one or more communication buses 312 for interconnecting these components. The communication buses 312 may include circuitry (sometimes called a chipset) that interconnects and controls communications between system components. The log processor 150 may optionally include a user interface, for instance a display and a keyboard. Memory 310 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may include mass storage that is remotely located from the central processing unit(s) 302. Memory 310, or alternately the non-volatile memory device(s) within memory 310, comprises a computer readable storage medium. In some embodiments, memory 310 or the computer readable storage medium of memory 310 stores the following programs, modules and data structures, or a subset thereof:
- an operating system 314 (e.g., Linux or Unix) that generally includes procedures for handling various basic system services and for performing hardware dependent tasks;
- a network communications module 316 that is used for connecting the log processor 105 to servers or other computing devices via one or more communication networks, such as the Internet, other wide area networks, local area networks, metropolitan area networks, and the like;
- a log access module 318 and a log access time recordation module 320. The log access module 318 accesses (e.g., by pushing or pulling) previously unread data stored in the log files 130 of web servers 120 that are participating in web analytics (205). In some embodiments, the log access module 318 determines which data is previously unread by looking at the most recent time entries in the log access time record 324 denoting the log access start time and end time of the previous iteration of accessing logfiles 130. The log access time recordation module 320 marks the time of accessing the data in a log access time record 324 (210). In some embodiments, because the log access module 318 may access large numbers of log files 130, the log access time recordation module 320 marks the time of accessing the data in a table data structure that includes a plurality of tablets that correspond to distinct non-overlapping table portions, and that may be stored, e.g., in data servers 106; and
- a log data processing module 326 that parses the read log data.

The log data processing module 326 processes the accessed data (from log files) to extract hits, which are stored in the Hits database 155 (220). In some embodiments, the log data processing module 326 handles each downloaded log data entry (read by the log access module 318) in turn, i.e. in a batch mode of processing. Such batch processing may be periodic or intermittent and may encompass any suitable time frame, ranging, for example, from overnight downloads of the day's log files to a download of several months or years of data. Once the last data entry is received (225), the log access time recordation module 320 records the end of log read time (228), for instance in log access time record 324.

In some embodiments, the log data processing module 326 transforms the log file into a normalized view. For instance, different web servers 120 may utilize different log formats. In some embodiments, the log data processing module 326 includes several different versions so as to process log data in different formats. For instance, if combining logs from different systems, the log data processing module 326 transforms the data to a single normalized format.

In some embodiments, the log data processing module 326 attempts to determine whether the log data entry 101 corresponds to an Internet Robot, Spider, link checker, mirror agent or other such non-human entity. Such entities generate tremendous amounts of web-site traffic and can significantly distort traffic statistics. The log data processing module 326 applies a filter representing such non-human entitles to each log data entry 101, as discussed below in greater detail. If a match is found, the corresponding entry is flagged as non-human entry and processed accordingly. By "scrubbing" the log data of such entities, the stage may be set for more realistic, precise and effective web-site analysis. Additionally, the log data processing module 326 may be configured to include, or exclude, visits from entities associated with the web-site itself, such as employees of the company that owns and/or operates the web-site. In some embodiments, the log data processing module 326 deletes such data; in other embodiments, the log data processing module 326 segregates but retains the data that is excluded from analysis.

The log data processing module 326 may also convert the information from the log entries 101 into information for which analytics data is aggregated. In some embodiments, the log data processing module 326 processes the IP or web address 131 to determine geographic information, such as country, state and city. This data may later be used to answer questions, such as how many visitors were there from California. The log data processing module 326 may process the user agent information 137 to determine the web browser name, web browser version, operating system name, operating system version, and so on. The log data processing module 326 may also determine what 'type' of session the server hit belongs to. For instance, a session may be a transaction, a page view, etc.

The log data processing module 326 stores the resulting data in a hits database 155, which in some embodiments is a multidimensional table, and is further described with reference to FIG. 5.

The resulting data in the hits database 155 can be used to compute analytics data, including dimensions and metrics. In analytics, a dimension is a component, characteristic, or category of data, typically represented as an alphanumeric string. Some examples of dimensions include: landing page (could be an entry page), exit page (the last page on a site accessed during a visit, signifying the end of a visit/session), page referrer (source of traffic to a page), session referrer (the first page referrer in a visit), and bounce (list of URLs and number of visits where they were the only URL viewed). Another dimension is a "conversion," which is a desired outcome of a web site interaction from the point of view of the web site owner. Conversions usually represent important business outcomes, such as completing a purchase, requesting a quote, clicking on a button on a web page, reaching a particular page on a site, and so on. Sometimes, conversions are chosen because they indicate potential for future behavior, such as clicking on an advertisement, registering for more information, or starting a checkout process.

A metric is a count or ratio measured across dimensions. Some examples of counts are:
 page views (number of times a page was viewed);
 visits (number of interactions, by an individual, with a website consisting of one or more requests for a page);
 unique visitors (number of inferred individual people, within a designated reported timeframe, with activity of one or more visits to a site);
 number of events (number of activities that happen within a page, such as, ad impressions, starting and completing transactions, changing form fields, starting multimedia views, etc., that have a specific date and time assigned to it);
 visit duration (the length of time in a session);
 click-through (number of times a link was clicked by a visitor);
 new visitors (number of unique visitors with activity include a first-ever visit to a site during a reporting period);
 returning visitors (number of unique visitors with activity consisting of a visit to a site during a reporting period and where the unique visitors also visited the site prior to the reporting period);
 repeat visitors (number of unique visitors with activity consisting of two or more visits to a site during a reporting period);
 recency (time since a unique visitor performed a specific action of interest);
 frequency (number of times an action was performed by a unique visitor over a period of time);
 number of single page visits (number of visits where the entry page and the exit page are the same page);
 number of conversions;
 number of purchases;
 number of sign-ups;
 hits (number of requests received by the server and/or ratios of other metrics);
 impressions (number of times a piece of content was delivered); etc.

A ratio is a derived metric, often obtained by dividing one number by another. The result is usually not a whole number. Examples of ratios include: click-through rate (number of click-through for a specific link divided by the number of times that link was viewed), visits per visitor (number of visits in a reporting period divided by the number of unique visitors for the same reporting period), page exit ratio (number of exits from a page divided by a total number of page views of that page), bounce rate (single page visits divided by entry pages), page views per visit (number of page views in a reporting period divided by number of visits in the same reporting period), and so on.

Aggregator Server 160

Figure 3A:
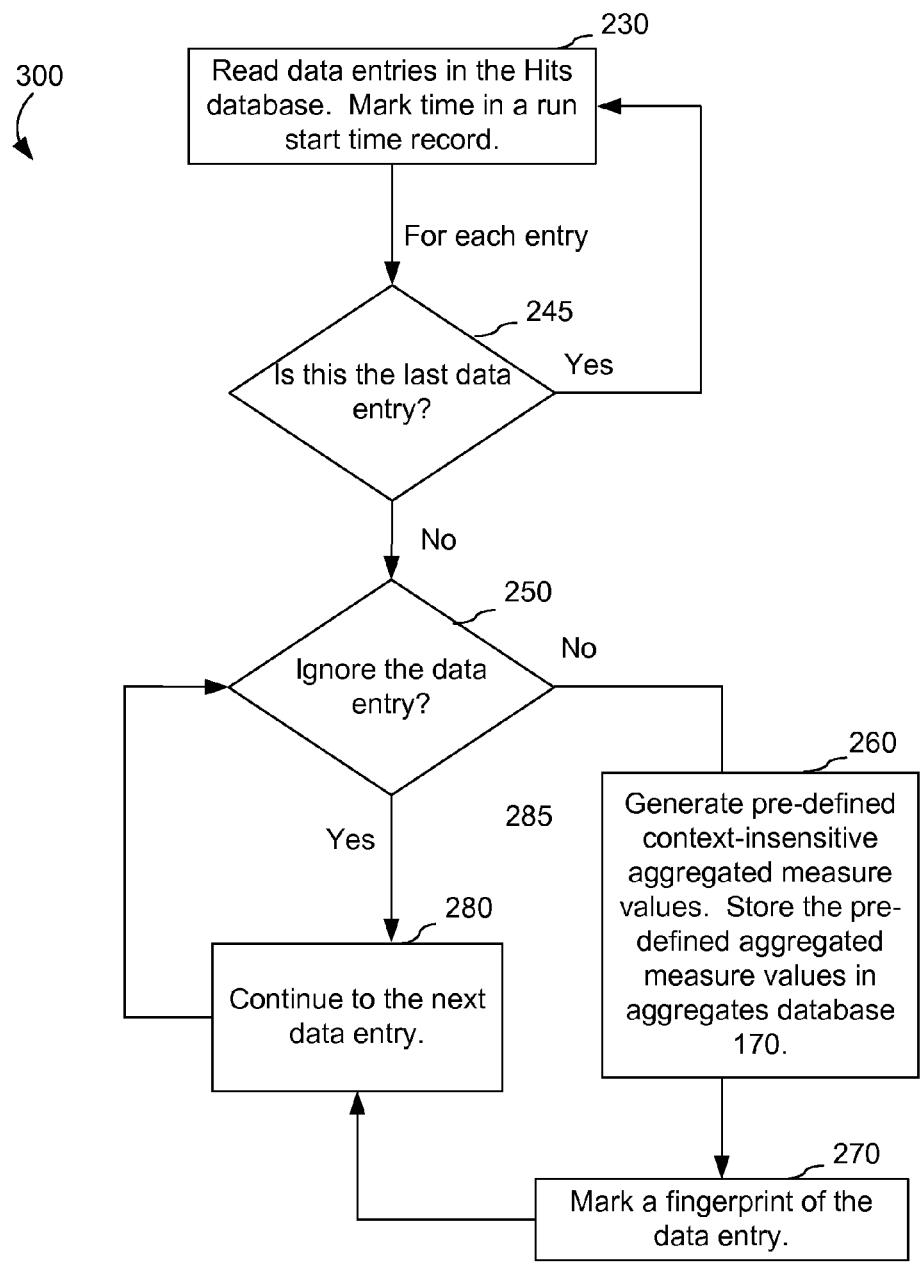
FIGS. 3A and 3B are flow diagrams of an embodiment of aggregating analytics data.
Figure 3B:
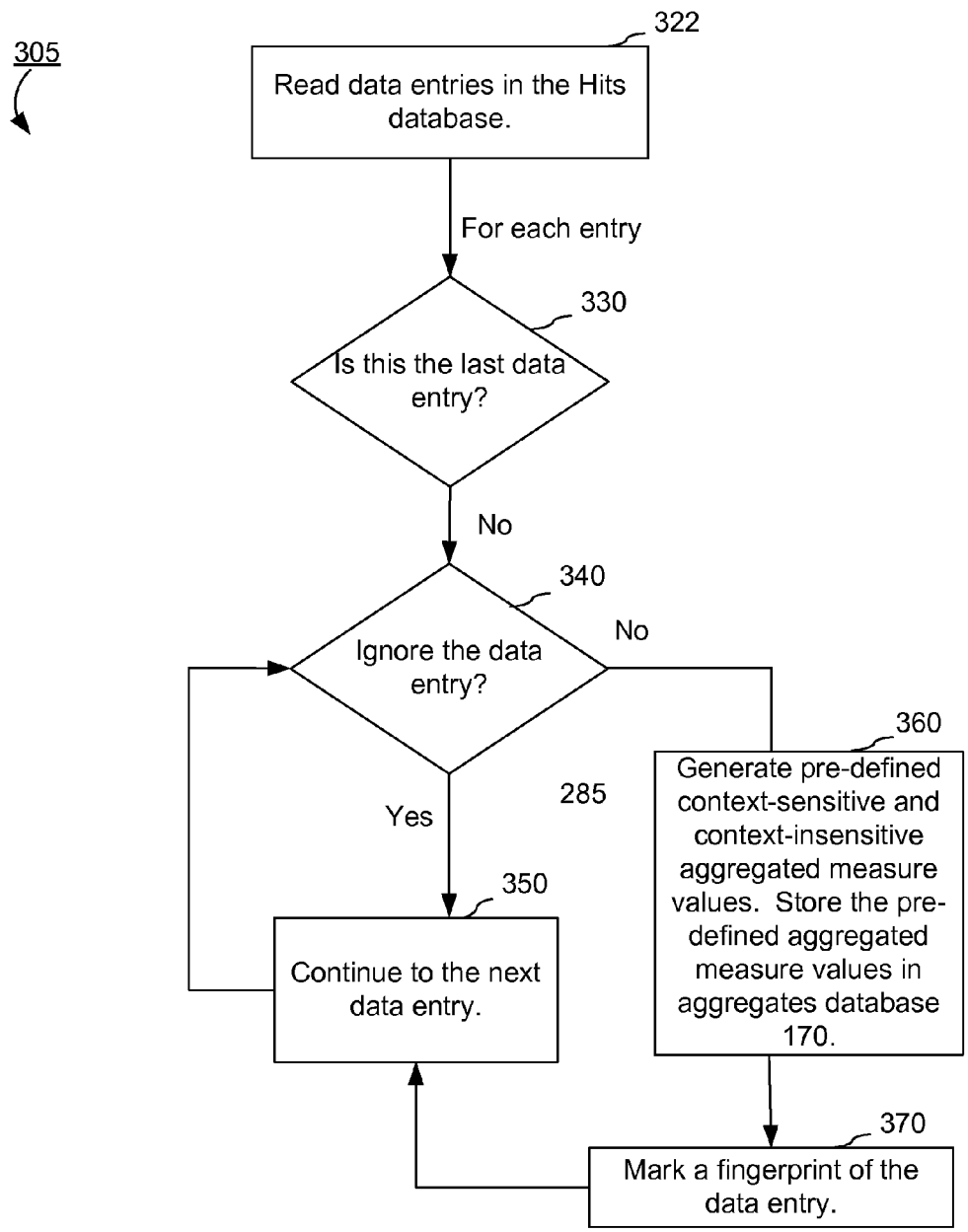
Figure 4:
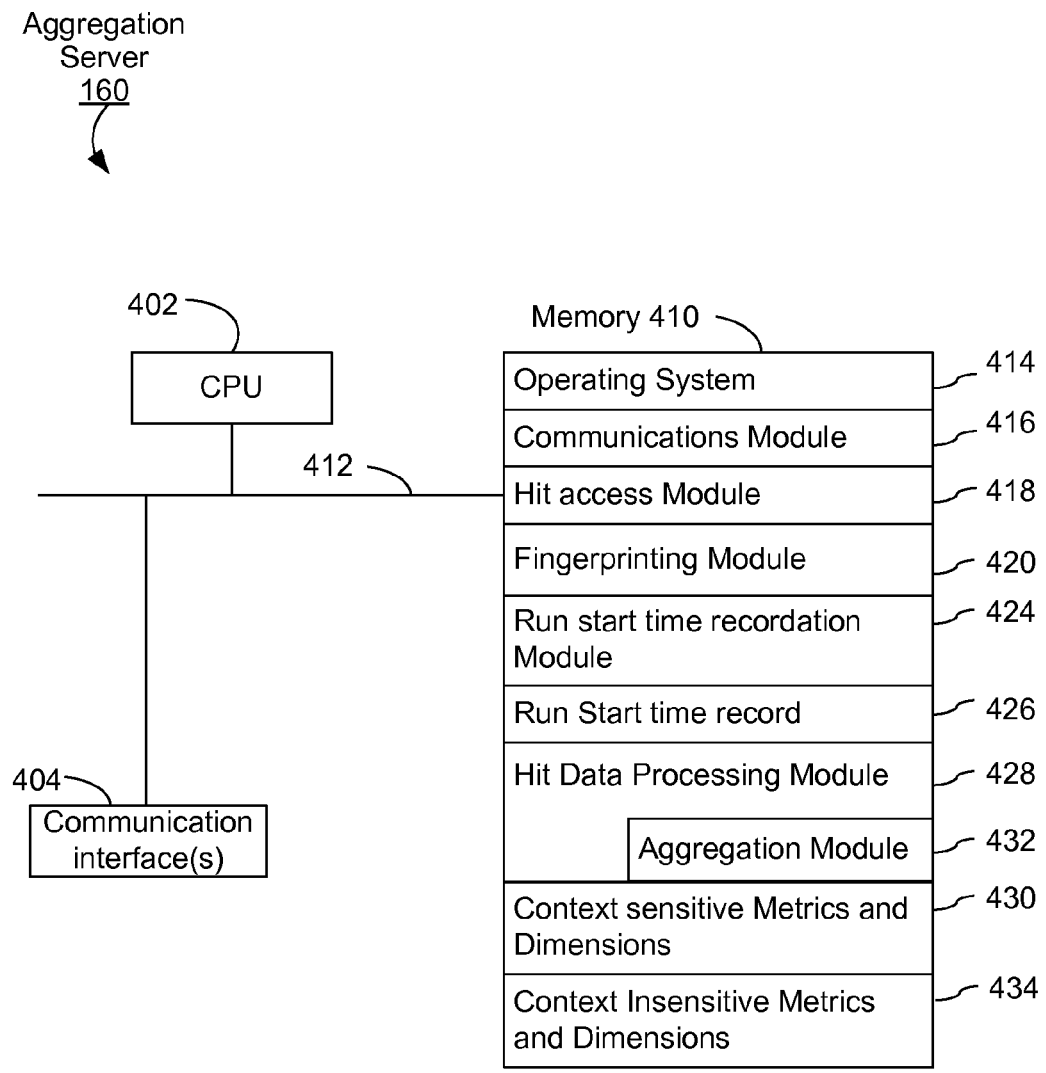
FIG. 4 is a block diagram of an aggregation server in accordance with some embodiments.
Figure 5:
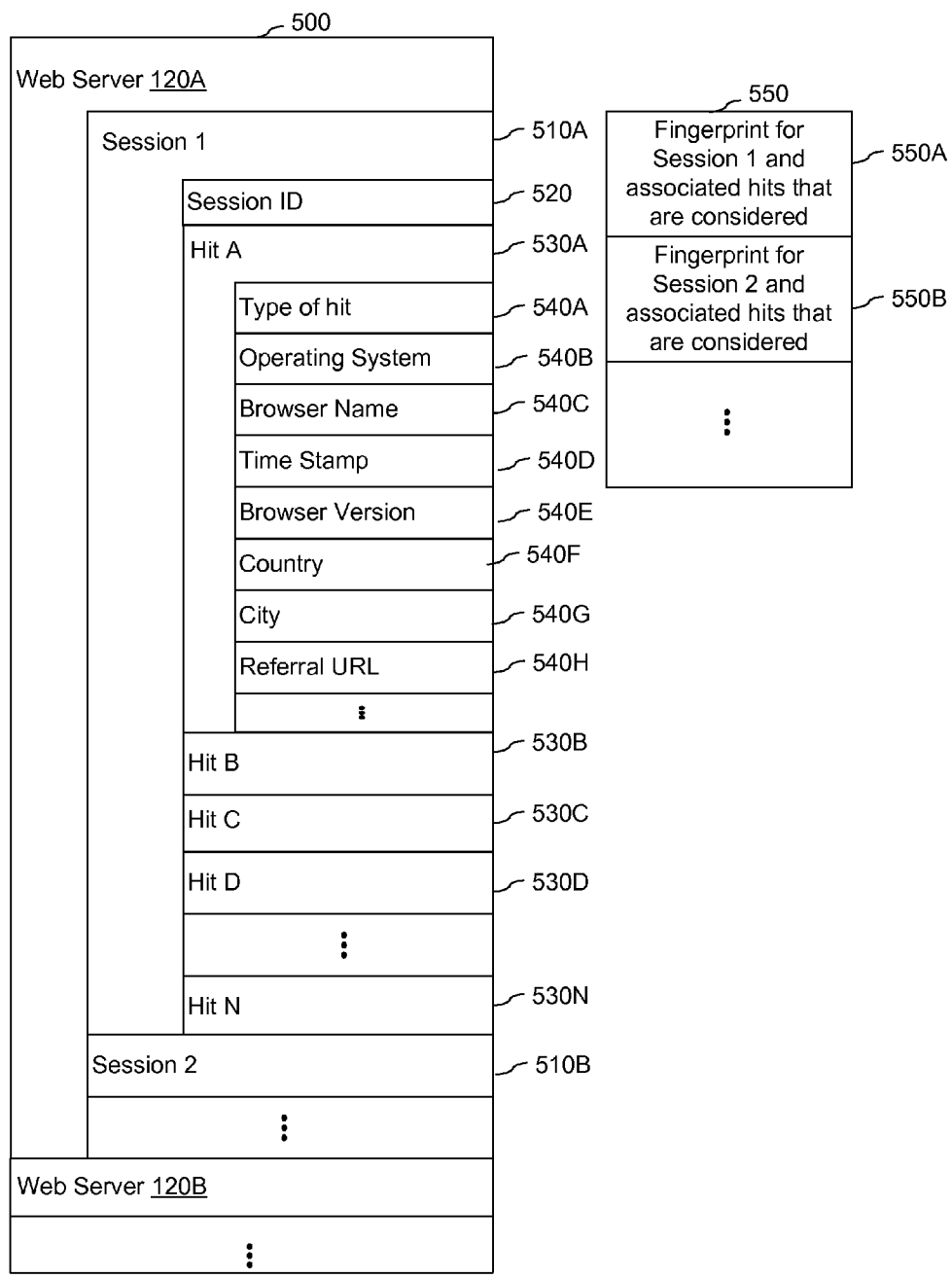
FIG. 5 illustrates an embodiment of a hits database that stores web server hits for web servers.

FIGS. 3A and 3B illustrate flow diagrams of embodiments of aggregation processes 300 and 305 performed by the aggregator server 160, an example embodiment of which is discussed in reference to FIG. 4. In some embodiments, the aggregation process 300 performed by the aggregator server 160 is performed in parallel with the log processing process 200 performed by the log processor 150. The process 300 is performed repeatedly. In some embodiments, process 300 is performed 10 or more times during a 24 hour time period. Each time process 300 executes, a new chunk of hit data accumulated in the hits database 155 is processed.

In some embodiments, the aggregator server 160 aggregates context-insensitive analytics data differently from context sensitive analytics data. FIG. 3A illustrates an embodiment of a process 300 for updating context-insensitive analytics data and FIG. 3B illustrates an embodiment of a process 305 for updating context sensitive analytics data. In some embodiments, context-insensitive analytics data is updated incrementally (e.g., each time a new hit entry is encountered). In contrast, context-sensitive analytics data is updated only when the updates can be done safely, such as at the end of a day.

Referring to FIG. 4, the aggregator server 160 generally includes one or more processing units (CPUs) 402, one or more network or other communications interfaces 404, memory 410, and one or more communication buses 412 for interconnecting these components. The communication buses 412 may include circuitry (sometimes called a chipset) that interconnects and controls communications between system components. The aggregator server 160 may optionally include a user interface, for instance, a display and a keyboard. Memory 410 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may include mass storage that is remotely located from the central processing unit(s) 402. Memory 410, or alternately the non-volatile memory device(s) within memory 410, comprises a computer readable storage medium. In some embodiments, memory 410 or the computer readable storage medium of memory 410 stores the following programs, modules and data structures, or a subset thereof:
- an operating system 414 (e.g., Linux or Unix) that generally includes procedures for handling various basic system services and for performing hardware dependent tasks;
- a network communications module 416 that is used for connecting the aggregator server 160 to servers or other computing devices via one or more communication networks, such as the Internet, other wide area networks, local area networks, metropolitan area networks, and the like;
- a hit access module 418 and a run start time recordation module 424. The hit access module 418 accesses hit data stored in the hits database 155 (230). The run start time recordation module 424 marks the start time of accessing the hit data in a run start time record 426 (230). In some embodiments, the log hit access module 418 determines which data is previously unread by looking at the most recent time entry in the log access time record 324;
- a Fingerprinting Module 420, which identifies a session and the hits for the session that have already been processed;
- a hit data processing module 428, which processes the hit data read by the hit access module 418. In some embodiments, hit data processing module 428 includes an aggregation module 432 for aggregating analytics data. In some embodiments, the aggregation module 432 builds and maintains aggregate tables, which is discussed further with reference to FIG. 6B;
- a list of context sensitive metrics and dimensions 430, and a list of context insensitive metrics and dimensions 434. Some of the metrics and dimensions are context sensitive, meaning that it is impossible to definitively know the values for these until the end of a specified time duration (e.g., time period), such as the end of a day. Even though these values could be incrementally updated, the results would not be accurate until the end of the day. An example of a context sensitive dimension is exit page, which is the last page on a web site accessed during a visit, signifying the end of a visit/session. This dimension could be updated for a session with the current last page entry for that session, but this would change every time a user visits another page. Thus, it cannot be definitively known from server hit data which page was the last page viewed by the visitor until after the passage of some time. Examples of context sensitive metric include: unique page views, time-on-site, etc. In contrast, most metrics and dimensions are context insensitive, meaning that they can be accurately updated incrementally.

Referring to FIG. 3A, the hit access module 418 accesses previously unread hit data stored in the hits database 155 (230). Concurrently, the run start time recordation module 424 marks the time when the hit access module 418 started accessing the hit data in a run start time record 426 (230). In some embodiments, the hit access module 418 determines which data has not been read by accessing the most recent time entry in the log access time record 324 (FIG. 3B). In some embodiments, the hits database 155 stores hit data 500 in a flat table grouped by user sessions and sorted by time (as deduced from the timestamp with each hit in each session). In other words, the hits entry for a particular user session is grouped together in the hits database 155, which is further discussed with reference to FIG. 5.

An example of the hit data stored in the hits database 155 is illustrated in FIG. 5. The hits database 155 stores hit data 500 for multiple web servers 120A-L, each of which can be associated with one or more web sites and/or pages. For each web server 120, hit data is stored for multiple sessions 510A-M. In some embodiments, hit data is stored for billions of sessions. For each session 510, a session identifier or session ID 520 is stored. As previously discussed, the session ID 520 uniquely identifies the user's session (a series of related message exchanges) with the web server 120 for the duration of that user's visit. For each session 510, data is stored for multiple hits 530A-530N. As discussed above, any server request is considered a hit. For example, when a visitor calls up a web page with six images, there are seven hits—one for the page, and six for the images.

For each hit, a plurality of information elements 540A-H are stored, which can be used for analytics data aggregation. The information elements 540 represent the information that is extracted by the log processor 150 from logfiles 130. As illustrated in FIG. 5, information 540 include type of hit 540A (e.g., transaction hit, etc.), name of operating system 540B, name of browser 540C, browser version 540E, time stamp 540D, country of hit origin 540F, city of hit origin 540G, referral URL 540H, and so on. FIG. 5 only illustrates a partial list of information elements 540. Some embodiments store many more types of information elements 540 for each hit 530.

Referring again to FIG. 3A, the hit data processing module 428 in some embodiments handles each hit in turn, i.e. in a batch mode of processing until the last hit entry in the hits database 155 is processed (245). For each hit entry in the hits database 155, the hit data processing module 428 determines whether to skip the entry (250). This may be necessary because, due to redundancy and/or fault tolerance requirements in large distributed systems, the same hit may be recorded more than once in the logfiles 130. In addition, hits may be recorded by the log processor 150 at different times.

In some embodiments, the hit data processing module 428 determines whether a hit is a redundant hit or a duplicate hit in an efficient manner by comparing the timestamp of a hit to the fingerprint 550 of its corresponding session 510. Accordingly, the hit data processing module 428 looks at the timestamp 540D associated with the hit 530A to determine if the hit 530A has already been processed. If the hit 530A has already been processed (250), the hit data processing module 428 continues (280) to the next hit (e.g., hit 530B). If this hit 530A were not ignored, the analytics data that would be aggregated could result in over-counting. For example, in a session 510A, hits A and B come in, and then at a later time, hits A and C come in. The hit data processing module 428 does not generate analytics data using the second instance of hit A to avoid overcounting.

If the hit 530A has not already been processed (250), the hit data processing module 428 processes the hit 530A by generating pre-defined context-insensitive aggregated measure values and storing the pre-defined aggregated measure values in one or more aggregate tables in the aggregates database 170 (260). In some embodiments, the hit data processing module 428 looks up the list of context insensitive metrics and dimensions 434, which may be stored in memory 410 as a look up table, and incrementally updates the pre-defined aggregated measure values for these metrics and dimensions. In this way, the aggregator server 160 aggregates the context insensitive metrics and dimensions incrementally, while aggregating the context sensitive metrics and dimensions after a specified time duration (e.g., time period), such as at the end of the day (as discussed further in reference to FIG. 3B). It is estimated that less than 10% of all metrics and dimensions are context sensitive. In this way, the aggregator server 160 is able to improve the freshness of more than 90% of the analytics data (represented by the context insensitive metrics and dimensions) to a shorter period of time than the prior art. For example, in some embodiments, updated aggregate data can be provided for each covered site at a cycle of between 30 and 45 minutes, which is an improvement over prior web analysis systems.

For each hit that is processed (260), the aggregation module 432 aggregates the context insensitive analytics data and stores the results in aggregate tables. These aggregate tables are also known as summary tables (260). Aggregate tables are tables that store aggregates of measures across multiple levels of a hierarchy. The aggregate tables may be stored in the aggregates database 170.

Further, for each hit that is processed (260), the hit data processing module 428 marks the hit (270). In some embodiments, the marking includes writing or updating a fingerprint for each hit that has been processed. FIG. 5 illustrates a list of fingerprints 550, which includes a fingerprint for each session and its associated hits that are processed and not ignored. For instance, suppose session 510A hits A and B have been considered thus far. The fingerprint 550 for session 510A may include: the session ID 520 for session 510A, a timestamp (e.g., T1) for the first hit 530A in the session 510A, and delta values for future hits (e.g., delta of Timestamp of second hit 530B and Timestamp of first hit 530A) that have been processed.

Continuing this example, suppose that during another run the hit data processing module 428 encounters a hit 530C that has the same timestamp as the hit 530A (i.e., the delta of Timestamp of hit 530C and Timestamp of first hit 530A equals zero), and thus is the same as the hit 530A. The hit 530C will be ignored and the fingerprint 550 will not change. As another example, suppose that during another run the hit data processing module 428 encounters a hit 530D that has the same timestamp as the hit 530B (i.e., the delta of Timestamp of the hit 530D and Timestamp of the first hit 530A equals delta of Timestamp of the hit 530B and Timestamp of the first hit 530A), and thus hit 530D is the same as hit 530B.

As discussed, the hit 530D will be ignored and the fingerprint 550 will not change. But, suppose the hit data processing module 428 encounters a hit 530N during a subsequent run that has not previously been encountered (i.e., the delta of timestamp of hit 530N and timestamp of hit 530A does not exist in the fingerprint 550A of session 510), and thus, it can be determined that hit 530N is a new hit. The hit 530N will be processed (260) to generate context-insensitive analytics data and the fingerprint 550A amended to include the delta of timestamp of hit 530N and timestamp of hit 530A.

The hit data processing module 428 continues to the next data entry (280) until all of the hits 530 in the Hits database 155 have been considered. The process 300 continues to incrementally update the context insensitive analytics data. At this time, the context sensitive analytics data is not updated.

FIG. 3B illustrates an embodiment of a process 305 for updating context sensitive analytics data. Process 305 is similar to process 300 except that process 305 is performed at a specified time, such as at the end of the day. This time represents the time at which the context sensitive analytics data is deemed to be safely updated. Further, during process 305, the context sensitive analytics data is aggregated. In some embodiments, the context insensitive analytics data may also be aggregated at the same time the context sensitive analytics data is aggregated.

In some embodiments, the hit data processing module 428 waits until it is time to aggregate the context sensitive metrics and dimensions, which may occur at a predefined time, such as at the end of the day. The hit access module 418 accesses (322) hit data that has accumulated in the hits database 155 for a predefined amount of time, such as for a 24 hour period.

In some embodiments, the hit data processing module 428 handles each hit (read by the hit access module 418) in turn, i.e. in a batch mode of processing until the last hit entry in the hits database 155 is processed (330). For each hit entry 530 in the hits database 155, the hit data processing module 428 determines whether to skip the entry (340).

For each hit that is processed (340), the aggregation module 432 aggregates the context sensitive analytics data and stores the results in aggregate tables, which are also known as summary tables (360). The aggregate tables may be stored in the aggregates database 170. In some embodiments, the aggregation module 432 also aggregates the context insensitive analytics data. Further, for each hit that is processed (340), the hit data processing module 428 marks the hit (370). In some embodiments, the marking includes marking a fingerprint as described with reference to FIG. 5. The hit data processing module 428 continues to the next data entry (350) until all of the hits 530 in the Hits database 155 (corresponding to the specified amount of time, such as the 24 hour period) have been considered.

The process of generating aggregates can be used at various stages of a data processing pipeline. For instance, the process of generating aggregates can be used by the query processor 180 to create on demand tables on the fly if the aggregate does not exist in an aggregate table.

In some embodiments, a generalized, reusable infrastructure component is provided that enables multiple system users to: define a group of aggregate tables, maintain aggregate tables efficiently, add data to an aggregate table, and read data from aggregate tables.

Figure 6:
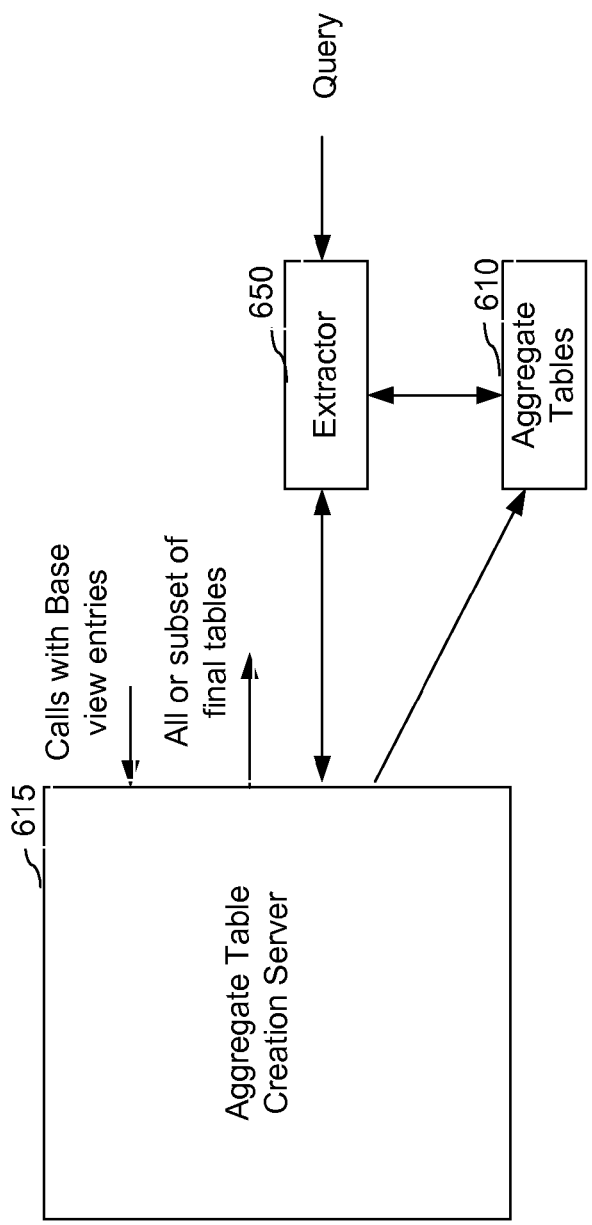
FIG. 6 is a block diagram of an embodiment of a system for building customizable aggregate tables on the fly.

FIG. 6 illustrates an embodiment of a system 600 for building and using customizable aggregate tables on the fly. In some embodiments, the system 600 includes an aggregate table creation server 615 that builds and maintains aggregate tables 610 that are generalized and reusable and can be used with any type of aggregate data (including, but not limited to, analytics data). In some embodiments, the aggregate table creation server 615 builds the aggregate tables 620 on the fly, upon receiving table definitions, and no coding is required to create additional aggregate tables as a rule. The aggregate table creation server 615 allows a system programmer to easily define new aggregate tables that combine different types of hit data without concern about the data being normalized (as it would be in a typical database) or even stored in a relational database. In particular, the hits database is a flat database in some embodiments. Instead, customized extractors 650 do the work of pulling data from the hits table/base view 155 for a particular dimension or metric and make it available for aggregating. The same extractors 650 can be used repeatedly to build any number of aggregates. If there is a need to use a new/previously unused dimension or metric in an aggregate table, then a system programmer will need to program a new extractor class, which can then be freely reused. This structure allows the creation of aggregate tables 610 to be streamlined and freed from the underlying structure of the database records being aggregated. Similarly, this structure means that user views can be created easily because user views can query custom aggregate tables. The data for such views is returned quickly because the data exists in pre-defined in the aggregate tables. In fact, it has been shown for a prior version of Google Analytics that 95% of all end user requests for views can be fulfilled from the pre-defined aggregate tables. In addition, the aggregate tables take-up only 25% of the total storage allocated to the hits database and the aggregate tables.

In some embodiments, a method of creating aggregate tables for web analytics includes receiving a plurality of aggregate table definitions, generating respective aggregate table classes that, when executed, cause the server to: generate respective aggregate tables for a particular web site based on the received aggregate table definitions, and populate and update data entries in the aggregate tables for the particular web site based on their corresponding aggregate table definitions and hits data derived from log files for the particular web site. A particular aggregate table class includes: retrievers (extractors) to retrieve from the hits table data for the metrics and dimensions used in the first aggregate table; and filters to filter the metrics and dimensions retrieved from the hits table according to the first aggregate table definition, among other modules. A first aggregate table definition includes descriptions of metrics and dimensions to be included in a respective first aggregate table such that the hits data used to populate and update the first aggregate table correspond to the metric and dimension descriptions in the first aggregate table definitions.

In some embodiments, a user can specify a modification to an existing aggregate table definition. The modification may use a graphical user interface and/or a high-level programming language such as C++ or Java. In response to receiving the modification, a new aggregate table definition is generated using the modification. The new aggregate table class, when executed, causes the server to perform the generating, populating, and updating operations for the new aggregate table.

In some embodiments, data from a first aggregate table is reused in the second table without accessing the hits table for those dimensions or metrics that are duplicates of dimensions or metrics in the first aggregate table.

In some embodiments, an interface is provided for end users, which enable end users to select for viewing at least a subset of the web analytics data. If the selected view corresponds to data in one or more aggregate tables, data is retrieved from the at least one aggregate table and returned to the end user in a respective view. If the selected view corresponds to data that is not stored in any aggregate table, a corresponding query is executed in the hits database 155. The data from the hits database 155 is retrieved and returned to the end user in a respective view.

Figure 7:
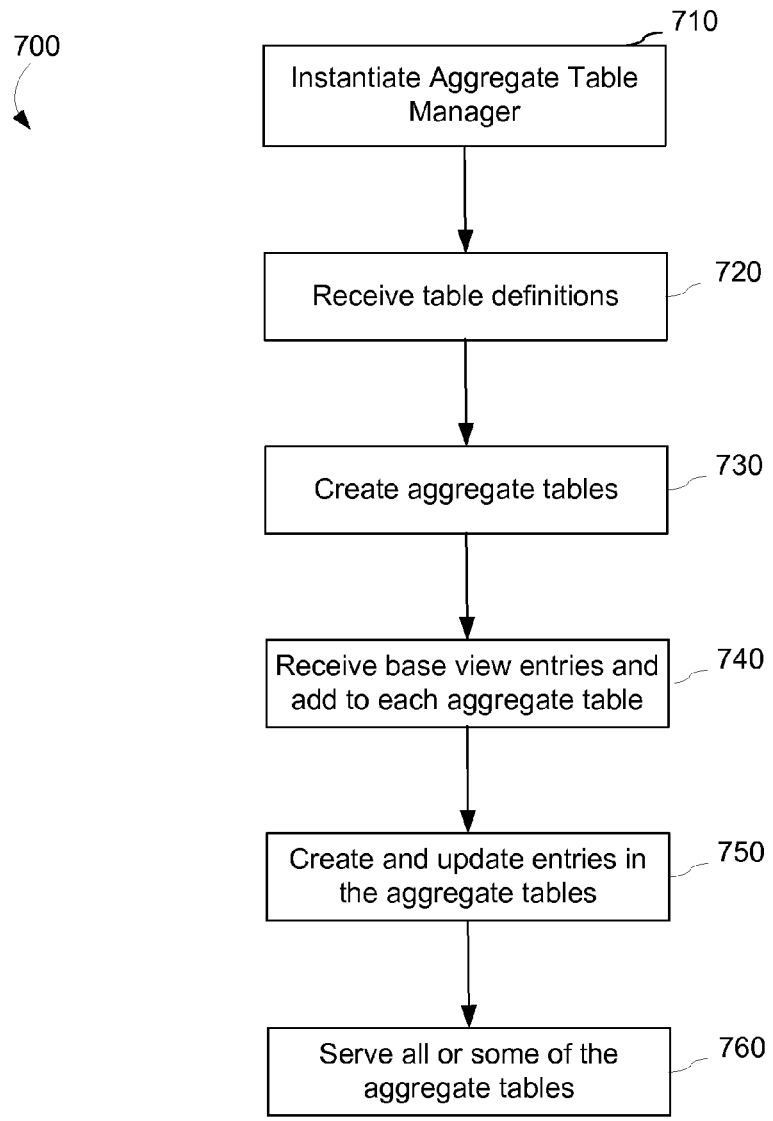
FIG. 7 illustrates an embodiment of a process to build customizable aggregate tables on the fly.

FIG. 7 illustrates an embodiment of a process 700 performed by the aggregate table creation server 615 to build customizable aggregate tables on the fly. An example embodiment of the aggregate table creation server 615 is discussed in reference to FIG. 8. In some embodiments, the aggregation module 432 is implemented as aggregate table creation server 615.

Figure 9:
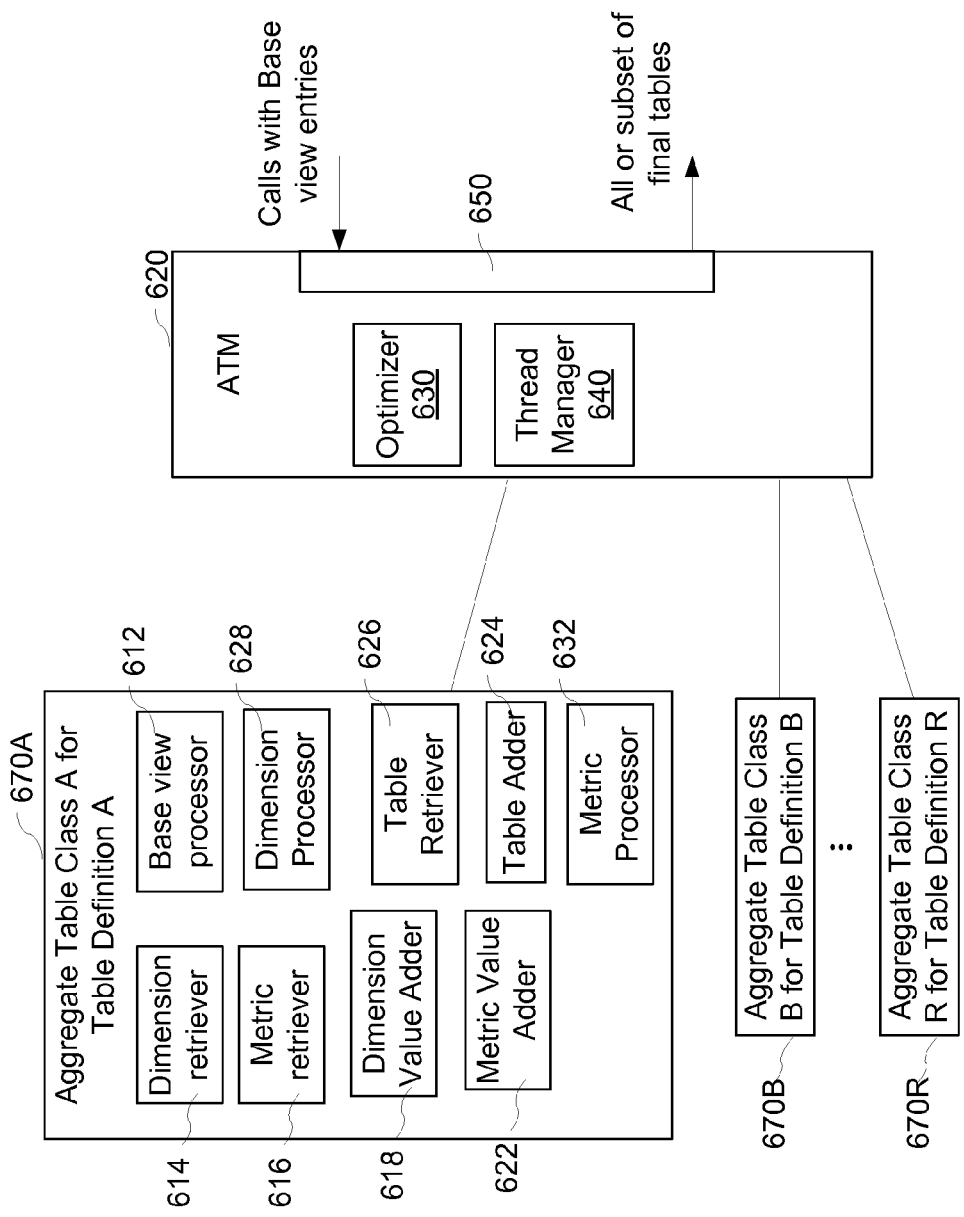
FIG. 9 illustrates an embodiment of an aggregate table manager and aggregate tables classes.

The aggregate table creation server 615 generally includes one or more processing units (CPUs) 802, one or more network or other communications interfaces 804, memory 810, and one or more communication buses 812 for interconnecting these components. The communication buses 812 may include circuitry (sometimes called a chipset) that interconnects and controls communications between system components. The aggregate table creation server 615 may optionally include a user interface, such as a display and a keyboard. Memory 810 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 810 may include mass storage that is remotely located from the central processing unit(s) 802. Memory 810, or alternately the non-volatile memory device(s) within memory 810, comprises a computer readable medium. In some embodiments, memory 810, or the computer readable storage medium of memory 810, stores the following programs, modules and data structures, or a subset thereof:

- an operating system 813 (e.g., Linux or Unix) that generally includes procedures for handling various basic system services and for performing hardware dependent tasks;
- a network communications module 814 that is used for connecting the aggregate table creation server 615 to servers or other computing devices via one or more communication networks, such as the Internet, other wide area networks, local area networks, metropolitan area networks, and the like;
- an Aggregate Table Manager ("ATM") 818 that creates and manages a group of aggregate tables classes 610 and performs optimization and maintenance across them (710). An example ATM is illustrated in FIG. 9. ATM 620 creates aggregate table classes 610, each of which manages an aggregate table corresponding to its table definition. In some embodiments, the ATM class provides such functionality as row/column maintenance, memory management, and underlying storage format optimizations, and can be used to create customized aggregate tables using table definitions. For instance, the table definitions (discussed below) include a user information field that can be used to customize the aggregate table;
- table definitions 816 that are used to created aggregate tables. The table definitions 816 are received from system programmers, for instance, using a GUI (720). In some embodiments, the user interface for creating table definitions is sufficiently simple that certain end users (who are not system programmers) are able to create table definitions. A table definition describes a particular aggregate table 610. A table definition is essentially a schema for the individual table 610. In some embodiments, fields in the table definition include:

An Identifier for the aggregate table;
A description of the aggregate table;
A list of dimensions to be aggregated;
A list of filters to be applied to the dimensions (which might have restrictions like EXACT match only, etc.);
A list of metrics to be aggregated;
Sort information that defines how the table entries are to be sorted, e.g., in ascending order of time stamp value etc.;
Maximum number of columns in each row of the aggregate table;
Maximum number of rows of the aggregate table;
Sampling lower and upper bound, which can be used to decide when to sample/discard some of the dimensions and keep the top N elements. This occurs, for example, when a web site produces lots of dimensions for an aggregate table;
Maximum key (dimension) space size specifies how many unique combinations of dimensions and metrics to return. For example, a user may only want to know the top 10 browsers (based on their pageviews), and not all; and
User Information field, which can be used by different users to specify team specific (non standard) information for the table definitions.

As an example, it is possible to define an aggregate table 610 with the following characteristics:
(dimensions) campaign, adgroup and keywords;
(metrics) associated pageviews and clicks;
(dimension filters) medium=cpc and source=google;
(sort) sorted by pageviews;
(maximum key space) only the top 50000 entries are kept;
(number of rows) the result appears in 2 rows;
(number of columns in each row) with 25,000 columns in each row.

The table definition could further specify that if at any point there are more than 200000 unique dimensions (sampling upper bound) then we only keep the top 100000 entries (sampling lower bound);
aggregate table classes 610 that generates individual aggregate tables for each received table definition (730). Aggregate table classes 610 are described further with reference to FIG. 9;
single base view prototype 822, which is received from a user and added by the ATM 620 to each aggregate table that the ATM manages (740). A base view is used to answer a user view query when the query cannot be answered using an aggregate table. If there is not an aggregate table that answers a view query, then the view is generated on the fly, which is slow compared to reading from an aggregate table.

The aggregate tables 610 create and update entries in the aggregate tables according to their respective table definitions (750). In response to receiving a request for all or a subset of the aggregate tables, the ATM 620 serves the aggregate tables (760). In some embodiments, end users issue view requests, which are typically answered from the aggregate tables 610.

For example, a user may wish to dynamically create two aggregate tables: one which compares browsers versus pageviews (table definition A) and another which compares browsers and flash version versus pageviews (table definition B). An ATM is instantiated (710). The ATM then creates two aggregate table classes 610—one having the table definition A and another having the table definition B (730). Suppose there are 10 visits (the base view) that need to be aggregated. The 10 visits are retrieved by the ATM, which recognizes that browsers and flash versions are the only two keys (dimensions) being aggregated and pageview is the only value (metric). The ATM thus retrieves these values just once from the base view, and will pass the data on to both of the aggregate table classes 610. Aggregate tables A and B update their counts corresponding to their respective table definitions (750). The user can then ask the ATM for the aggregated tables corresponding to table definition A and table definition B (760).

FIG. 9 illustrates an embodiment of the ATM 620 and aggregate table classes 670A-R. The ATM 620 sits as a layer on top of all the aggregate tables 610 and manages them. The ATM 620 includes an optimizer 630 to provide optimizations that apply to a range of aggregate tables 610 and to perform transformations that may apply to all or a subset of aggregate tables 610. The ATM 620 includes a thread manager 640 to perform efficient resource management, such as performing thread management (e.g., if different aggregate tables are run in multiple threads). The ATM 620 includes a unified interface 650 to add and retrieve data to or from aggregate table(s) 610. The interface 650 allows users to add one or more table definitions or a set of table definitions. In some embodiments, the table definition(s) can be added in various formats (e.g. BigTable, GFS file, protocol buffer, CDD etc.). The interface 650 also allows users to retrieve the information associated with the aggregate table(s) 610 in the row, column format specified in the corresponding table definitions. The interface 650 also receives a base view entry and adds it to all or a subset of the aggregate tables 610 it manages.

An aggregate table class 670 performs the actual aggregation of data based on the data provided by the ATM 620 and the table definition with which the specific instance is created with. The aggregate table class 670A includes a base view processor 612 that adds the data corresponding to a base view entry to the aggregate table. The aggregate table class 670A includes a dimension value retriever 614 (extractor) to retrieve a requested dimension's value for a given base view entry. The aggregate table class 670A includes a metric value retriever 616 (extractor) to retrieve a requested metric's value for a given base view entry. The aggregate table class 670A includes a dimension value adder 618 that adds the extracted dimension value to the corresponding aggregate table. The aggregate table class 670A includes a metric value adder 622 that adds the extracted metric value to the corresponding aggregate table. In some embodiments, the aggregate table class 670A includes an aggregate table adder 624 for adding an existing aggregate table to a table, which can be useful for instance, when aggregating partial aggregate tables. The aggregate table class 670A includes a table retriever 626 for retrieving the information associated with the table in the row, column format specified in the corresponding table definition.

In some embodiments, the aggregate table class 670A includes a dimension processor 628 to determine if a dimension's value can be calculated just once for the base view and can be reused. For instance, the value for "browser" can be calculated once and reused across all aggregate tables that have browser as a key, while all tables that have URL as a key cannot since the value of URL changes within the base view. In some embodiments, the dimension processor 628 may alternatively be provided in the ATM 620. The aggregate table class 670A (or alternatively the ATM 620) may include a metric processor 632 to determine if a metric's value can be calculated just once for the base view and can be reused.

Each of the identified elements stored in memory 310 or memory 410 or memory 810 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 310 and/or memory 410 and/or memory 810 may store a subset of the modules and data structures identified above. Furthermore, memory 310 and/or memory 410 and/or memory 810 may store additional modules and data structures not described above.

Figure 8:
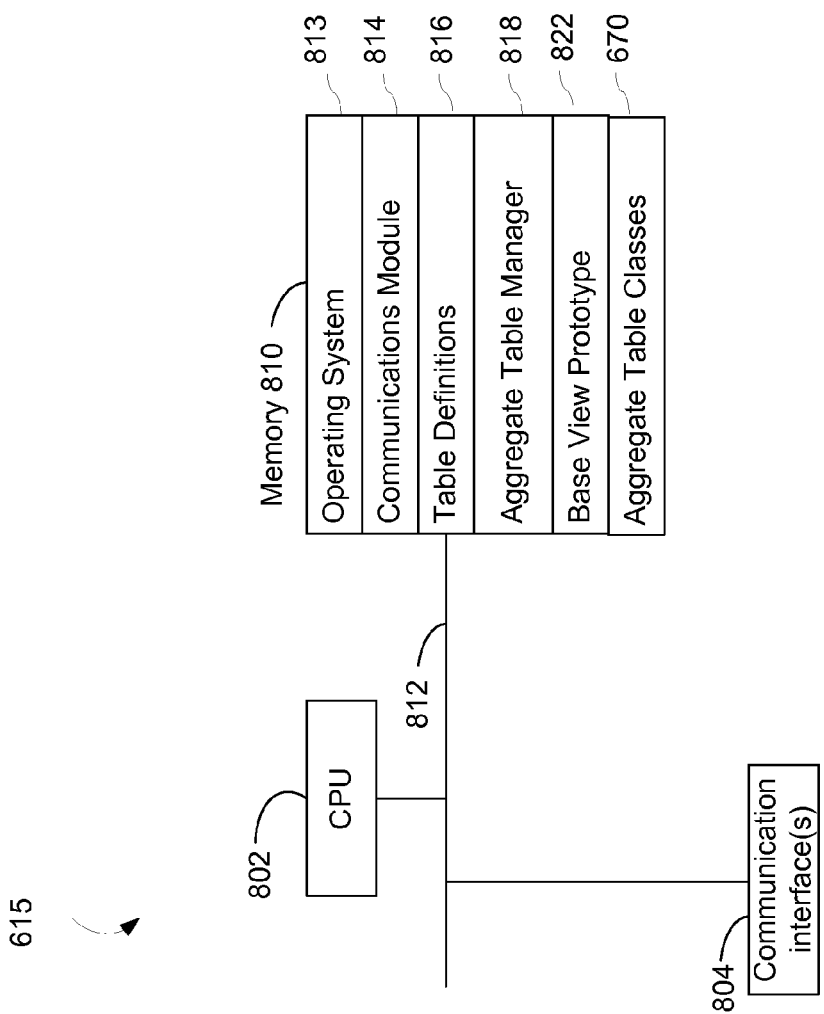
FIG. 8 is a block diagram of an embodiment of a system for building customizable aggregate tables on the fly.

Although FIG. 2B shows a log processor and FIG. 4 shows an aggregation server and FIG. 8 shows a system 615 for building customizable aggregate tables on the fly, FIGS. 2B, 4 and 8 are intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIGS. 2B, 4 and 8 could be implemented on single servers and single items could be implemented by one or more servers. The actual number of servers used to implement a log processor, and aggregation server, or an aggregate table creation server, and how features are allocated among them will vary from one implementation to another, and may depend in part on the amount of data traffic that the system must handle during peak usage periods as well as during average usage periods.

Each of the methods described herein may be performed by instructions that are stored in a computer readable storage medium and that are executed by one or more processors of one or more servers or clients. Each of the operations shown in FIGS. 2A, 3A, 3B and 7 may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for creating aggregate tables for web analytics, the method comprising:
at a server having one or more processors and memory, performing the following:
receiving a web site selection;
receiving a plurality of aggregate table definitions;
generating respective aggregate tables for the web site according to the received aggregate table definitions;
populating and updating data entries in the generated aggregate tables for the web site based on their corresponding aggregate table definitions and server hit data derived from log files for the web site and stored in a hits table;
providing a user interface for selection of a view of web analytics data;
receiving a view selection from a user utilizing the user interface;
determining whether the selected view includes data in one or more aggregate tables;
when the selected view includes data in at least one aggregate table:
retrieving data from the at least one aggregate table; and
returning the data to the user in a respective view; and
when the selected view includes data that is not stored in any aggregate table:
executing a corresponding query in the hits table;
retrieving the data from the hits table in response to the query; and
returning the data to the user in a respective view.

2. The method of claim 1, wherein the one or more custom aggregate table definitions correspond to the web site.

3. The method of claim 1, wherein the log files for a website are in two or more different formats.

4. The method of claim 1, wherein a first aggregate table definition of the one or more custom aggregate table definitions specifies metrics and dimensions to be included in a first aggregate table and wherein the server hit data used to populate and update the first aggregate table corresponds to the metrics and dimensions specified in the first aggregate table definition.

5. The method of claim 4, further comprising:
generating an aggregate table class according to the first aggregate table definition, wherein the class executes at the server to perform the generating, populating, and updating operations for the first aggregate table.

6. The method of claim 5, wherein the aggregate table class includes:
retrievers to retrieve server hit data for the metrics and dimensions used in the first aggregate table; and
filters to limit the server hit data retrieved according to the first aggregate table definition.

7. The method of claim 4, wherein the first aggregate table definition further includes:
descriptions of filtering to be performed on the hits data corresponding to one or more of the metrics and dimensions; and
a sort order indicating a sort operation to be performed on data in the first aggregate table and a metric or dimension on which the sort operation is to be applied.

8. The method of claim 4, further comprising:
receiving a modification to an existing aggregate table definition; and
generating a new aggregate table definition using the modification.

9. The method of claim 8, further comprising:
generating from the new aggregate table definition a respective aggregate table class that, when executed, causes the server to perform the generating, populating, and updating operations for a new aggregate table.

10. The method of claim 9, further comprising:
reusing data from the first aggregate table in the new aggregate table without accessing a hits table for those dimensions or metrics that are duplicates of dimensions or metrics in the first aggregate table, wherein the hits table stores the server hit data.

11. An analytics data aggregation system, comprising:
one or more processors;
memory; and
one or more programs stored in the memory, the one or more programs comprising instructions for:
receiving a web site selection;
receiving a plurality of aggregate table definitions;

generating respective aggregate tables for the web site according to the received aggregate table definitions;

populating and updating data entries in the generated aggregate tables for the web site based on their corresponding aggregate table definitions and server hit data derived from log files for the web site and stored in a hits table;

providing a user interface for selection of a view of web analytics data;

receiving a view selection from a user utilizing the user interface;

determining whether the selected view includes data in one or more aggregate tables;

when the selected view includes data in at least one aggregate table:
retrieving data from the at least one aggregate table; and
returning the data to the user in a respective view; and when the selected view includes data that is not stored in any aggregate table:
executing a corresponding query in the hits table;
retrieving the data from the hits table in response to the query; and
returning the data to the user in a respective view.

12. The data aggregation system of claim 11, wherein the one or more custom aggregate table definitions correspond to the web site.

13. The data aggregation system of claim 11, wherein a first aggregate table definition of the one or more custom aggregate table definitions specifies metrics and dimensions to be included in a first aggregate table and wherein the server hit data used to populate and update the first aggregate table corresponds to the metrics and dimensions specified in the first aggregate table definition.

14. The data aggregation system of claim 13, further comprising instructions for:
generating an aggregate table class according to the first aggregate table definition, wherein the class executes at the server to perform the generating, populating, and updating operations for the first aggregate table.

15. The data aggregation system of claim 14, wherein at least one aggregate table class includes:
retrievers to retrieve server hit data for the metrics and dimensions used in the first aggregate table; and
filters to limit the server hit data retrieved according to the first aggregate table definition.

16. The data aggregation system of claim 13, wherein the first aggregate table definition further includes:
descriptions of filtering to be performed on the hits data corresponding to one or more of the metrics and dimensions; and
a sort order indicating a sort operation to be performed on data in the first aggregate table and a metric or dimension on which the sort operation is to be applied.

17. The data aggregation system of claim 13, further comprising instructions for:
receiving a modification to an existing aggregate table definition; and
generating a new aggregate table definition using the modification.

18. The data aggregation system of claim 17, further comprising instructions for:
generating from the new aggregate table definition a respective aggregate table class that, when executed, causes the server to perform the generating, populating, and updating operations for a new aggregate table.

19. The data aggregation system of claim 18, further comprising instructions for:
reusing data from the first aggregate table in the new aggregate table without accessing a hits table for those dimensions or metrics that are duplicates of dimensions or metrics in the first aggregate table, wherein the hits table stored the server hit data.

20. A computer-implemented method for creating aggregate tables for web analytics, comprising:
at a server computer having one or more processors and memory, performing the following:
receiving an aggregate table definition from a user, the aggregate table definition including a description of metrics and dimensions to be included in the aggregate table for a particular web site, data for the metrics and dimensions being stored in a hit table generated from log files for the particular web site;
building an executable class definition for the aggregate table based on the aggregate table definition, the class definition including:
retriever modules configured to extract data for respective dimensions and metrics from the hit table and to populate the aggregate table with the extracted data;
generator modules configured to generate views for an end user corresponding to the data in the aggregate table;
executing a class corresponding to the executable class definition, thereby generating and populating an aggregate table according to the aggregate table definition;
providing a user interface for selection of a view of web analytics data;
receiving a view selection from a user utilizing the user interface;
determining whether the selected view includes data in one or more aggregate tables;
when the selected view includes data in at least one aggregate table:
retrieving data from the at least one aggregate table; and
returning the data to the user in a respective view; and
when the selected view includes data that is not stored in any aggregate table:
executing a corresponding query in the hits table;
retrieving the data from the hits table in response to the query; and
returning the data to the user in a respective view.

* * * * *